US010641401B1

(12) United States Patent
Lopez

(10) Patent No.: US 10,641,401 B1
(45) Date of Patent: May 5, 2020

(54) WEARLESS MULTI-PORT WATER DISTRIBUTION VALVE ASSEMBLY WITH BOTTOM INLET

(71) Applicant: Pool Patch LLC, Phoenix, AZ (US)

(72) Inventor: Thomas V. Lopez, Phoenix, AZ (US)

( * ) Notice: Subject to any disclaimer, the term of this patent is extended or adjusted under 35 U.S.C. 154(b) by 0 days.

(21) Appl. No.: 15/055,520

(22) Filed: Feb. 26, 2016

(51) Int. Cl.
*F16K 11/074* (2006.01)

(52) U.S. Cl.
CPC ........ *F16K 11/074* (2013.01); *F16K 11/0743* (2013.01); *Y10T 137/269* (2015.04); *Y10T 137/86413* (2015.04); *Y10T 137/86501* (2015.04)

(58) Field of Classification Search
CPC ......... Y10T 137/269; Y10T 137/86413; Y10T 137/86501; F16K 11/0743
See application file for complete search history.

(56) References Cited

U.S. PATENT DOCUMENTS

| | | | |
|---|---|---|---|
| 3,730,208 A * | 5/1973 | Lewis | F16K 11/0743 137/119.07 |
| 4,077,424 A * | 3/1978 | Ehret | F16K 11/074 137/119.07 |
| 4,313,455 A * | 2/1982 | Pitman | F16K 11/074 137/119.07 |
| 4,458,708 A | 7/1984 | Leonard et al. | |
| 4,492,247 A | 1/1985 | Lockwood | |
| 4,570,663 A | 2/1986 | Gould et al. | |
| 4,817,656 A | 4/1989 | Gould | |
| 5,316,042 A * | 5/1994 | Lim | F16K 3/08 137/625.11 |
| 5,762,092 A | 6/1998 | Yang | |
| 6,189,556 B1 | 2/2001 | Blake et al. | |
| 6,311,728 B1 | 11/2001 | Goettl et al. | |
| 6,314,999 B1 | 11/2001 | Conn | |
| 6,325,087 B1 | 12/2001 | Tarr | |
| 6,360,767 B1 | 3/2002 | Barnes | |
| 6,386,232 B2 * | 5/2002 | Serrano Sanchez | E04H 4/169 137/119.07 |
| 6,539,967 B2 | 4/2003 | Tarr | |
| 6,732,760 B2 * | 5/2004 | Mellado | F16K 11/165 137/119.07 |
| D538,890 S | 3/2007 | Park | |
| 8,256,461 B1 * | 9/2012 | Sutton | F16K 11/074 123/90.6 |
| 8,714,182 B2 | 5/2014 | Malinasky, Jr. | |
| 9,222,274 B1 | 12/2015 | Goettl et al. | |
| D784,493 S | 4/2017 | Lopez | |
| 9,625,041 B1 | 4/2017 | Lopez | |
| 9,695,952 B2 | 7/2017 | Lopez | |

(Continued)

*Primary Examiner* — Kevin F Murphy
(74) *Attorney, Agent, or Firm* — Thomas W. Galvani, P.C.; Thomas W. Galvani

(57) ABSTRACT

A water distribution valve assembly is carried in a multi-port water distribution valve with a bottom inlet. The assembly includes a bearing plate including a plurality of openings, and a valve plate including a port, the valve plate mounted for rotation on and with respect to the bearing plate. A drive assembly is operably coupled to impart rotational movement of the valve plate with respect to the bearing plate, in response to the application of a flow of water, through a plurality of positions each characterized by the port of the valve plate being aligned with a respective one of the plurality of openings.

25 Claims, 9 Drawing Sheets

(56) References Cited

U.S. PATENT DOCUMENTS

2009/0211641 A1\* 8/2009 Tipotsch ............... F16K 11/074
            137/1
2011/0225717 A1  9/2011 Malinasky, Jr.
2016/0238143 A1  8/2016 Lopez \* cited by examiner

US 10,641,401 B1

WEARLESS MULTI-PORT WATER DISTRIBUTION VALVE ASSEMBLY WITH BOTTOM INLET

FIELD OF THE INVENTION

The present invention relates generally to swimming pools, and more particularly to valve assemblies for use with pool pump equipment in swimming pools having in-floor cleaning systems.

BACKGROUND OF THE INVENTION

There are many ways to clean a pool, and pool owners are continually looking for easier ways to do so. Pools can be cleaned by hand, such as by brushing the pool surface with a brush fit on the end of a long pole. This causes debris and material collected on the pool surface to be lifted off the surface; when the pool pump and filter assembly is operated in conjunction with this practice, the debris and water are together drawn through the pool pump into a filter which filters and collects much of the debris, thereby removing it from the pool and rendering the pool cleaner. Brushing can be laborious and time-consuming, however.

Automatic pool vacuums were developed to reduce the work of pool owners. Pool vacuums operate in a number of different ways, but most creep along the pool surface and suck, or disturb and then suck, debris and material collected on the pool surface up a hose into the operating pump and filter assembly. Vacuums can be difficult to operate, however. They must be calibrated to provide sufficient suction, they must be maintained, they are vulnerable to jamming from large debris, and they usually provide a random cleaning pattern that may be inadequate.

In-floor cleaning heads were developed as an automated, low-oversight way to keep a pool surface clean. In-floor cleaning heads are outlets that are permanently installed in the swimming pool structure. The heads recede into the pool structure when not in use, and then pop up when operating. Although there are a great number of kinds of pop-up heads, most operate with the basic functionality of directing a stream of water across a portion of the pool surface to clean that portion of the pool surface. Some heads rotate to direct that stream across different portions of the pool surface. Typically, the heads are installed in a number of locations across a pool surface, and often clusters of heads are grouped together in "lines," with each line including heads that receive water independently of the heads in other lines. This independent operation of lines requires a way to provide a flow of water to each line independently, and so swimming pool distribution valves were developed.

Swimming pool distribution valves generally have an inlet, a plurality of outlets, and some internal mechanism for directing the flow of water from the inlet to each of the outlets independently. However, many swimming pool distribution valves are susceptible to wear, which requires laborious maintenance or difficult replacement. Additionally, many distribution valves are susceptible to water blow-by, in which leaks develop between inlet and outlet, allowing water to flow into the other lines and thereby reducing the effectiveness of the valve. Back pressure can also develop in some valves, causing the valve to jam or fail. Still further, some prior art valves suffered from sharing water while one outlet is fully open—allowing one outlet to be completely open while another outlet is partially open, leading to ineffective cleaning. An improved water distribution valve is needed.

SUMMARY OF THE INVENTION

A water distribution valve assembly is carried in a multi-port water distribution valve with a bottom inlet. The assembly includes a bearing plate including a plurality of openings, and a valve plate including a port, the valve plate mounted for rotation on and with respect to the bearing plate. A drive assembly is operably coupled to impart rotational movement of the valve plate with respect to the bearing plate, in response to the application of a flow of water, through a plurality of positions each characterized by the port of the valve plate being aligned with a respective one of the plurality of openings.

BRIEF DESCRIPTION OF THE DRAWINGS

Referring to the drawings.

DETAILED DESCRIPTION

Figure 1A:
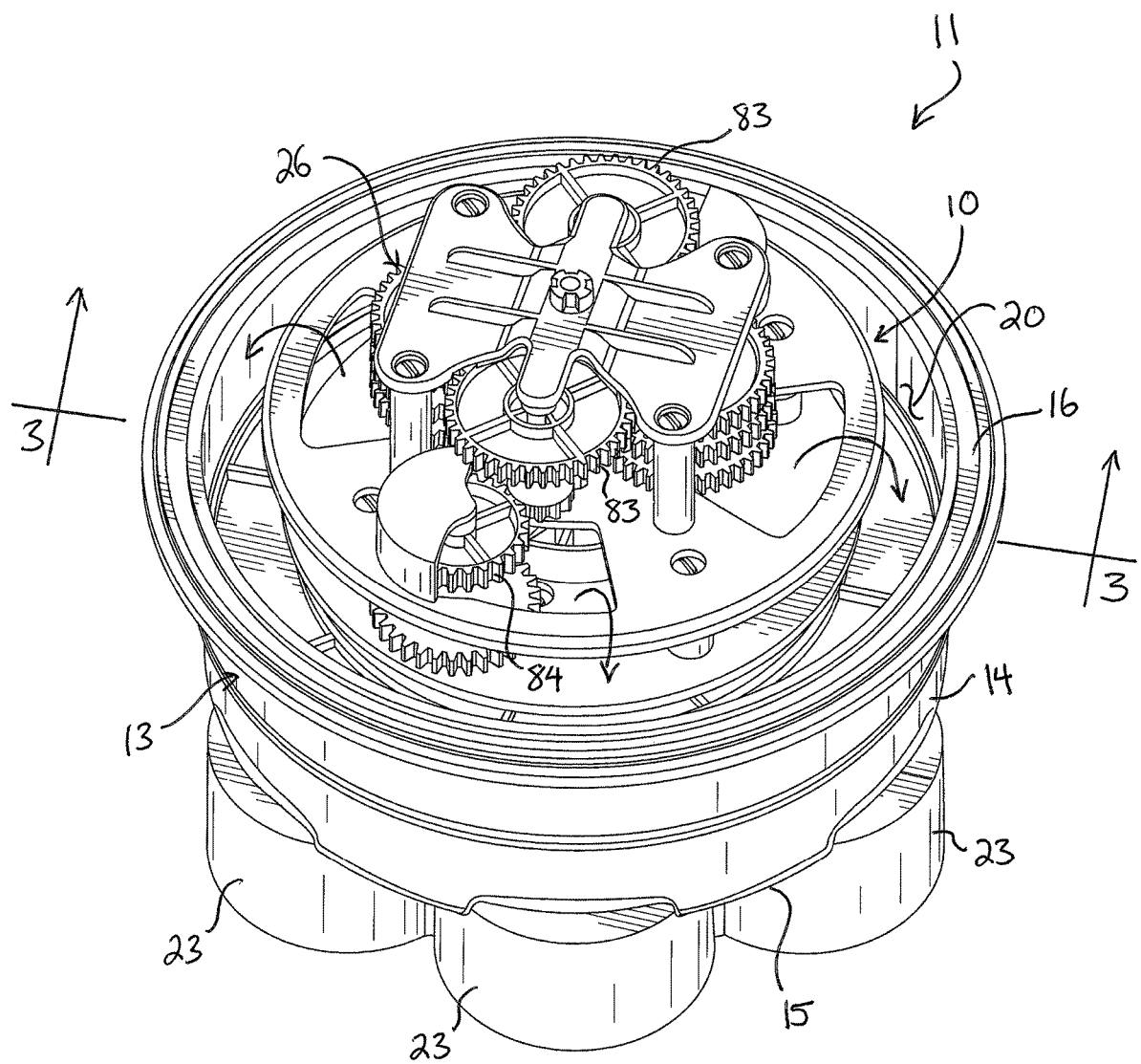
FIGS. 1A and 1B are top and bottom perspective views, respectively, of a multi-port water distribution valve carrying a distribution assembly.
Figure 1B:
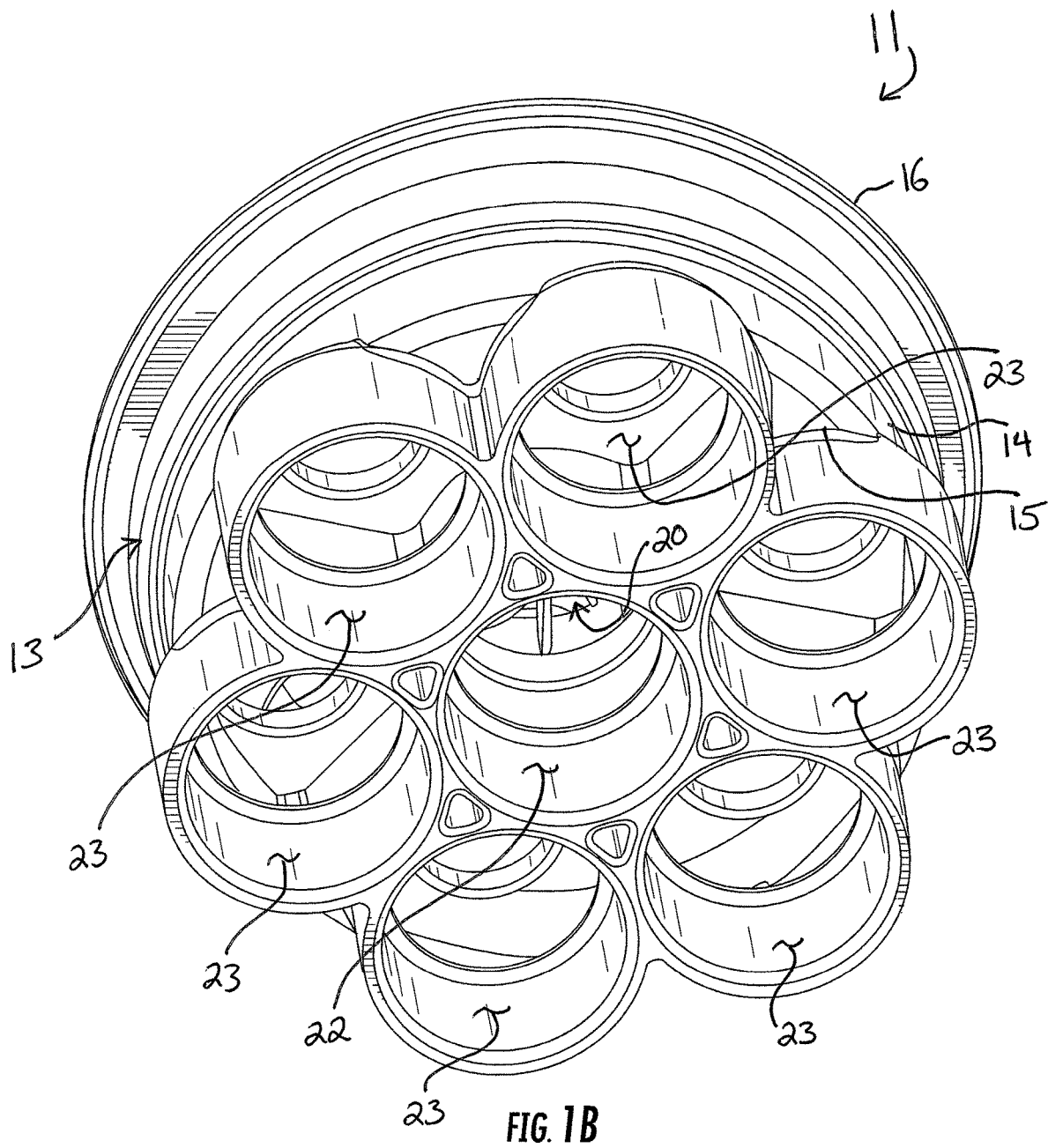

Reference now is made to the drawings, in which the same reference characters are used throughout the different figures to designate the same elements. FIGS. 1A and 1B are top and bottom perspective views of a wearless multi-port water distribution valve 11 including a distribution assembly 10 carried therein. The distribution assembly 10 is adapted to sequentially direct an incoming flow of water from a lower inlet to lower outlets without any leaks among the outlets. The valve 11 directs the flow of water among several conduits of a conventional piping assembly, each of which extends from one of the outlets of the valve 11 and each of which leads to a line of in-floor cleaning heads installed in the swimming pool. The valve 11, fitted with the distribution assembly 10, is useful for sequentially communicating water to each in-floor cleaning head to clean the pool surface of dirt, debris, growth, and other material without succumbing to internal wear, and without causing wear to any parts which are permanently fixed to the pool structure or the pump assembly.

FIG. 1A shows the valve 11 with a lid 12 removed. The lid 12 is shown in other drawings. The valve 11 includes a generally symmetric housing 13 having a sidewall 14 extending between a bottom 15 and a lip 16 defining a top 20 of the housing 13. The housing 13, together with the lid 12 (shown in FIG. 2) bounds and defines an interior 20. The distribution assembly 10 is carried in the interior 20.

Referring primarily now to FIG. 1B, but also to FIG. 1A, a downwardly-extending bottom inlet 22 is formed centrally in the bottom 15 in fluid communication with the interior 20, and six downwardly-extending outlets 23 are formed in the bottom 15 surrounding the inlet 22, also in fluid communication with the interior 20. Each of the inlet 22 and outlets 23 are cylindrical ports sized to interface and engage easily with conventional swimming pool pluming conduits, which are typically arranged in a circumferentially-spaced apart, radial arrangement with the inlet conduit centered among the outlet conduits. The pump of the swimming pool cleaning assembly pumps water through the inlet 22 into the interior 20 and then sequentially out each of the outlets 23 to each of the in-floor cleaning heads installed in the swimming pool.

Figure 2:
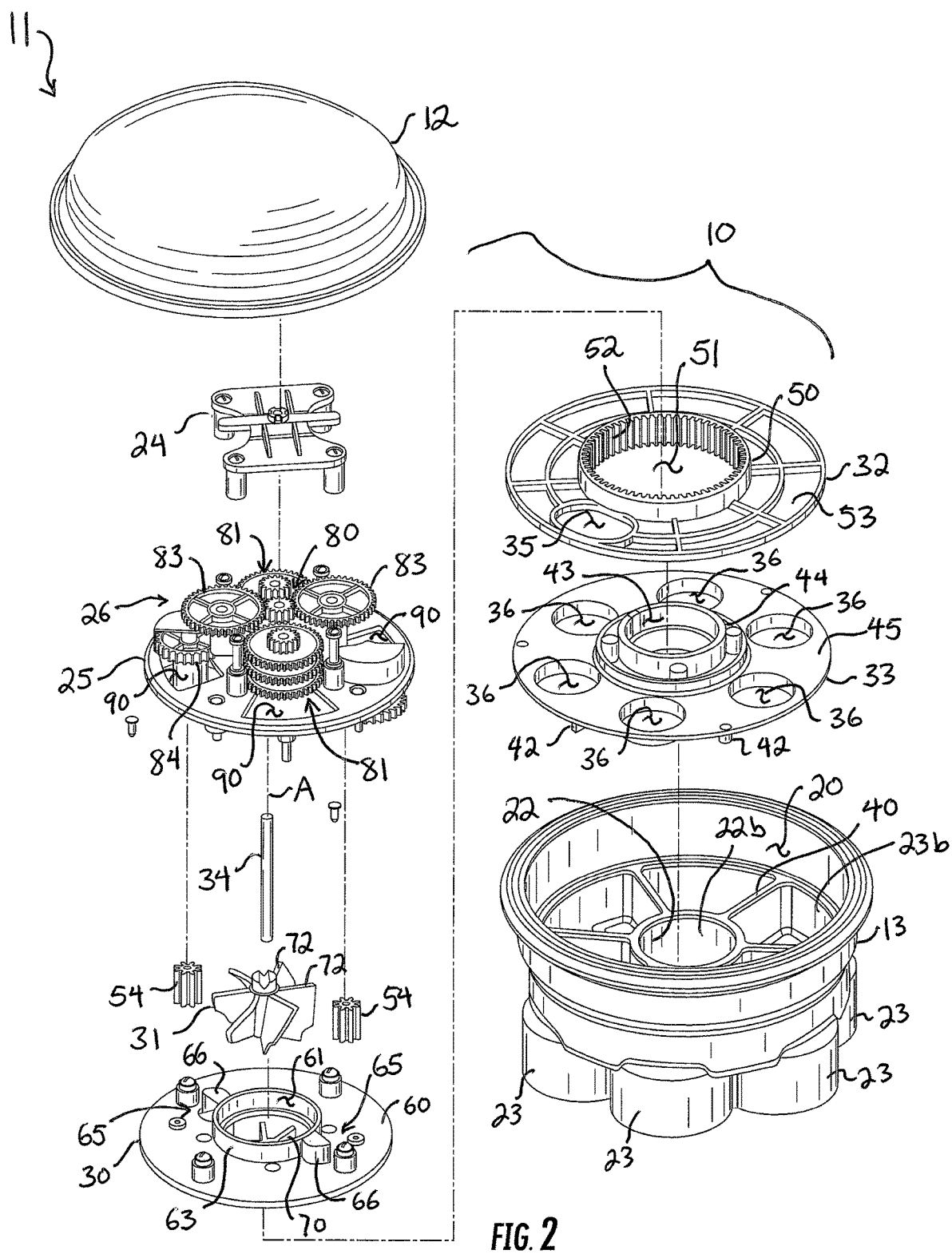
FIG. 2 is an exploded, top perspective view of the valve of FIG. 1A.

Referring now to FIG. 2, the housing 13 cooperates with the distribution assembly 10 carried in the interior 20 to sequentially and cyclically communicate water from the inlet 22 to each of the outlets 23 so that the surface of the swimming pool is cleaned. The housing 13, which in operation is plumbed to the conduits leading to the cleaning heads, carries the distribution assembly 10, which separates all of the moving parts of the valve 11 from interaction with the housing 13 so as to prevent wear to the housing 13. The distribution assembly 10 sequentially and cyclically communicates water from the inlet 22 to the outlets 23 and includes a cap 24, an upper table 25 carrying a reduction gear assembly 26, a lower table 30 carrying an impeller 31 and the upper table 25, a valve plate 32, and a bearing plate 33. A central axle 34 extends centrally through the distribution assembly 10 along a central axis identified with the reference character A in FIG. 2. For purposes of orientation, various terms will be used herein with reference to the axis A, such as "horizontal," which means extending generally perpendicular to the axis A, "vertical," which means extending generally parallel to the axis A, "radial," which means extending horizontally outward from or inward to the axis A, and "circumferential," which means extending in a horizontal arc defined by the axis A.

The valve plate 32—a portion of the distribution assembly 10—includes a single port 35 which extends entirely though the valve plate 32, oriented parallel to the axis A, to selectively allow water to pass through the valve plate 32 from the inlet 22 to the outlets 23, as will be explained in detail herein. The valve plate 32 is coaxial to and mounted for rotation about the axis A, and as the valve plate 32 rotates, the port 35 sequentially moves through a plurality of positions into alignment with openings 36 formed entirely through the bearing plate 33, oriented parallel with respect to the axis A, each of which is fixed in alignment with a respective one of the outlets 23, thereby allowing water from the interior 20 out the respective outlet 23. The use of a single port 35 in a monolithic horizontal valve plate 32 provides the advantage over prior art valves that only a single opening 36—and thus only a single outlet 23—can be fully opened at any given time, while also providing the advantage that the flow of water is purposely partially shared between neighboring outlets 22 for a brief time during movement of the port 35 from opening 36 to neighboring opening 36, as will be explained.

Figure 3:
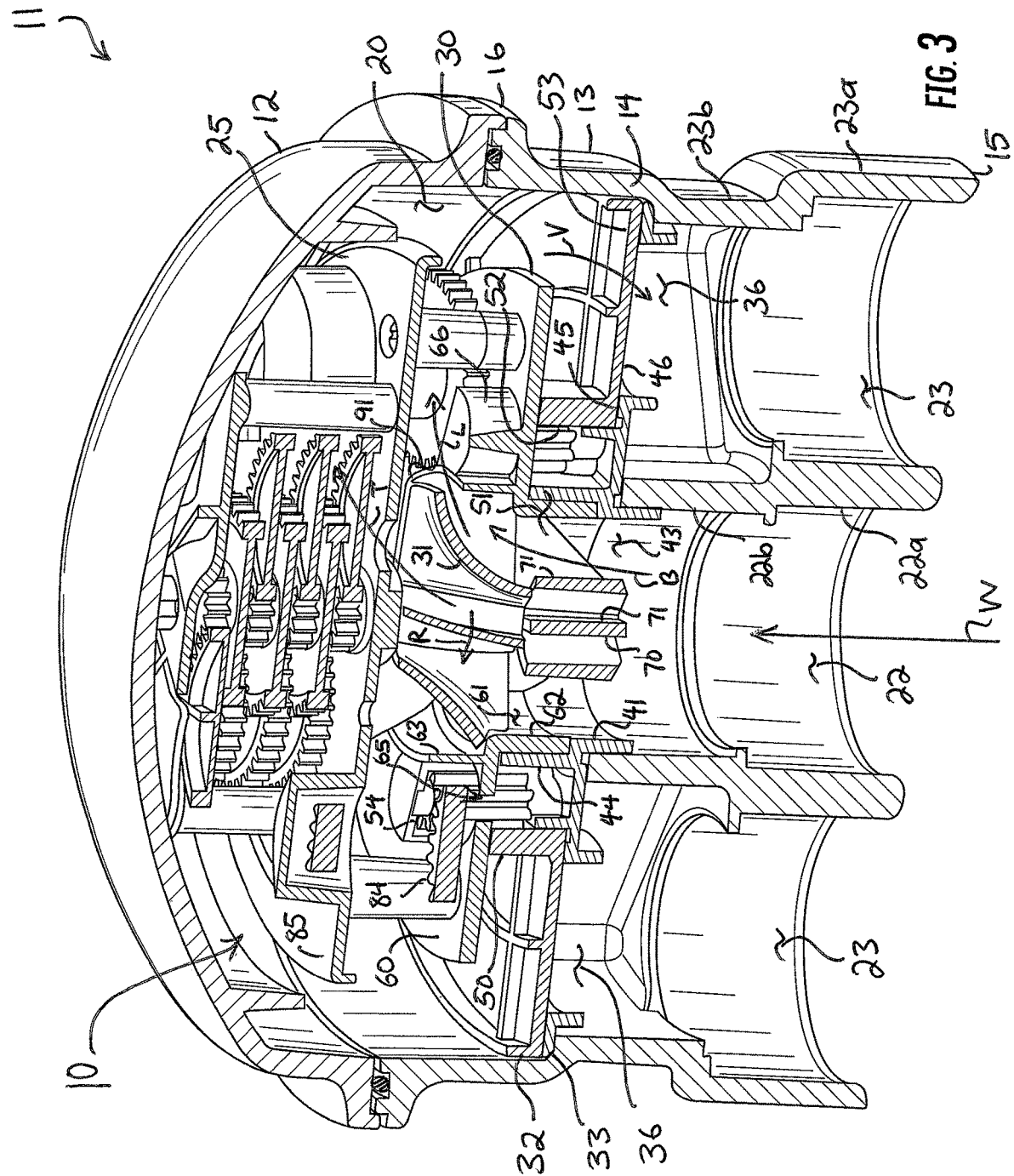
FIG. 3 is a section view of the valve of FIG. 1A taken along the line 3-3 in FIG. 1A.

Turning now to FIG. 3, which is a section view taken along the line 3-3 in FIG. 1A (and with the lid 12 shown applied), the distribution assembly 10 is shown applied within and operatively coupled to the housing 13 under the lid 12, ready to operate so as to divert water from the inlet 22 to each of the outlets 23. Each of the outlets 23 includes a cylindrical lower portion 23a and a narrowed, wedge-shaped upper portion 23b, thereby allowing the relatively compact housing 13 to interface with and couple to a conventional six-pipe plumbing configuration, most often installed and buried in the ground proximate to the swimming pool. Likewise, the inlet 22 includes a cylindrical lower portion 22a and a narrowed cylindrical upper portion 22b. As seen in FIG. 2, the upper portions 22b and 23b terminate at a common floor 40 defined by structural ribs extending horizontally across the housing 13. The floor 40 is a bottom of the interior 20. The bearing plate 33 is fit onto the floor 40 and extends entirely across the floor 40 between the sidewall 14 in direct contact with the floor 40, thus ensuring a snug and sealed fit between the outlets 23 and the bearing plate 33. Downward posts 42 (shown in FIG. 2) lock the bearing plate 33 to the floor 40 and prevent rotational movement of the bearing plate 33 relative to the floor 40. As seen in FIG. 3, the bearing plate 33 has a downwardly-turned collar 41 which fits into and is circumscribed by the upper portion 22b of the inlet 22, thus ensuring a snug and sealed fit between the inlet 22 and the bearing plate 33. The bearing plate is formed with the openings 36, each of which is circumferentially-spaced apart and corresponds to one of the outlets 23. Each opening 36 is aligned directly above and in fluid communication with one of the outlets 36. The outlets 36 are circular.

As shown in both FIGS. 2 and 3, the bearing plate 33 includes a central bore 43 extending through the bearing plate 33. The bore 43 is circumscribed by the collar 41 below the level of the bearing plate 33 and by an upstanding collar 44 above the level of the bearing plate 33.

The valve plate 32 rides on the bearing plate 33. The valve plate 32 is disposed directly above the bearing plate 33 and rotates about the central axis A by sliding in direct and continuous bearing contact against a top surface 45 of the bearing plate 33, such that the bearing plate 33 is interposed in direct contact between the floor 40 of the housing 13 and the valve plate 32. With brief reference to FIGS. 6A and 6B, which are exploded top and bottom perspectives of the distribution assembly 10, respectively, it can be seen that the top surface 45 of the bearing plate 33 and a corresponding bottom surface 46 of the valve plate are featureless but for the openings 36 and the port 35, respectively, allowing them to slide and rotate in direct contact against each other with low friction. Turning back to FIGS. 2 and 3, the valve plate 32 has a single disc-shaped lower element, defined by the annular, smooth bottom surface 46. The disc-shaped lower element is a lower flange 53 extending radially from an upwardly-extending collar 50. Formed entirely through the flange 53 is the port 35, which is an elongated oval, curved to correspond to the radius of the annular flange 53. The port 35 has a dimension in a radial direction and a dimension in a circumferential direction. In the radial direction, the dimension of the port 35 is equal to the diameters of the openings 36. In the circumferential direction, the dimension of the port 35 is larger than the diameters of the openings 36, so that the port 35 in its entirety is larger than each of the openings 36. The dimension of the port 35 in the circumferential direction is approximately one and half times larger than the diameters of the openings 36. Thus, for the purposes of this description, when the terms "aligned" or "alignment" are used, it is to be understood that the opening 36 is fully coupled in fluid communication with the port 35, i.e., the opening 36 is disposed below the port 35 but is not concealed by any part of the valve plate 35. In other words, the full expanse of the opening 36 is positioned within the port 35 and is not covered by the flange 53, but the opening 36 need not necessarily be centered with respect to the port 35. The upwardly-extending collar 50 defines a central bore 51 through the valve plate 32. The collar 50 is an upstanding annular wall having an inner geared surface 52 extending continuously around the inner surface of the collar 50, with vertical teeth directed inward into the central bore 51.

The valve plate 32 rotates smoothly on the bearing plate 33, which is held stationary against and with respect to the housing 13. Rotation of the valve plate 32 is imparted by a set of two spur or drive gears 54 depending from the reduction gear assembly 26. The drive gears 54 rotate on their own axes and cause the inner geared surface 52 of the valve plate 32 to rotate, riding against the drive gears 54. The drive gears 54 are diametrically opposed and prevent lateral movement of the valve plate 32.

Figure 6A:
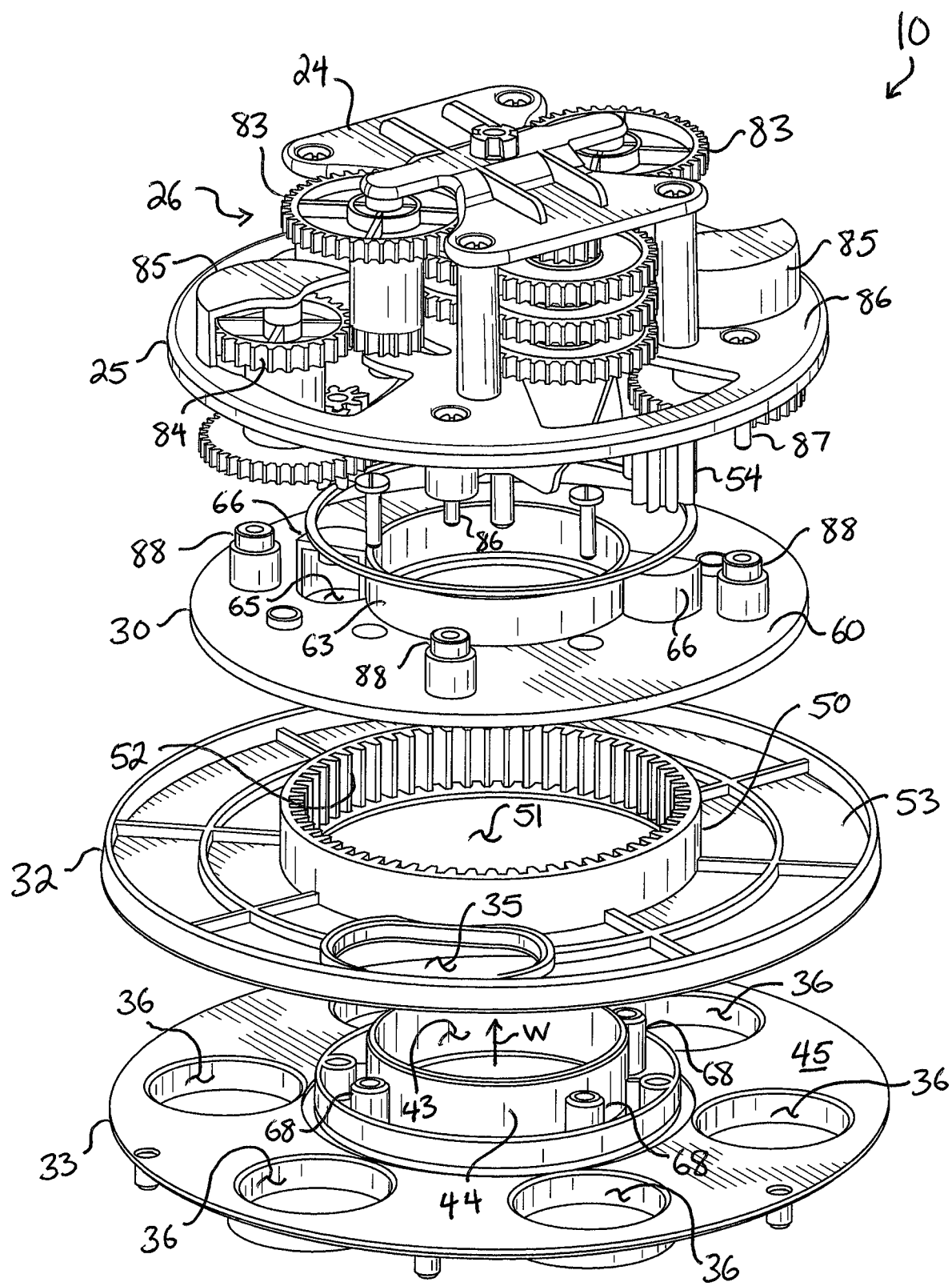
FIGS. 6A and 6B are exploded top and bottom perspective views, respectively, of the distribution assembly of FIG. 1A in isolation.
Figure 6B:
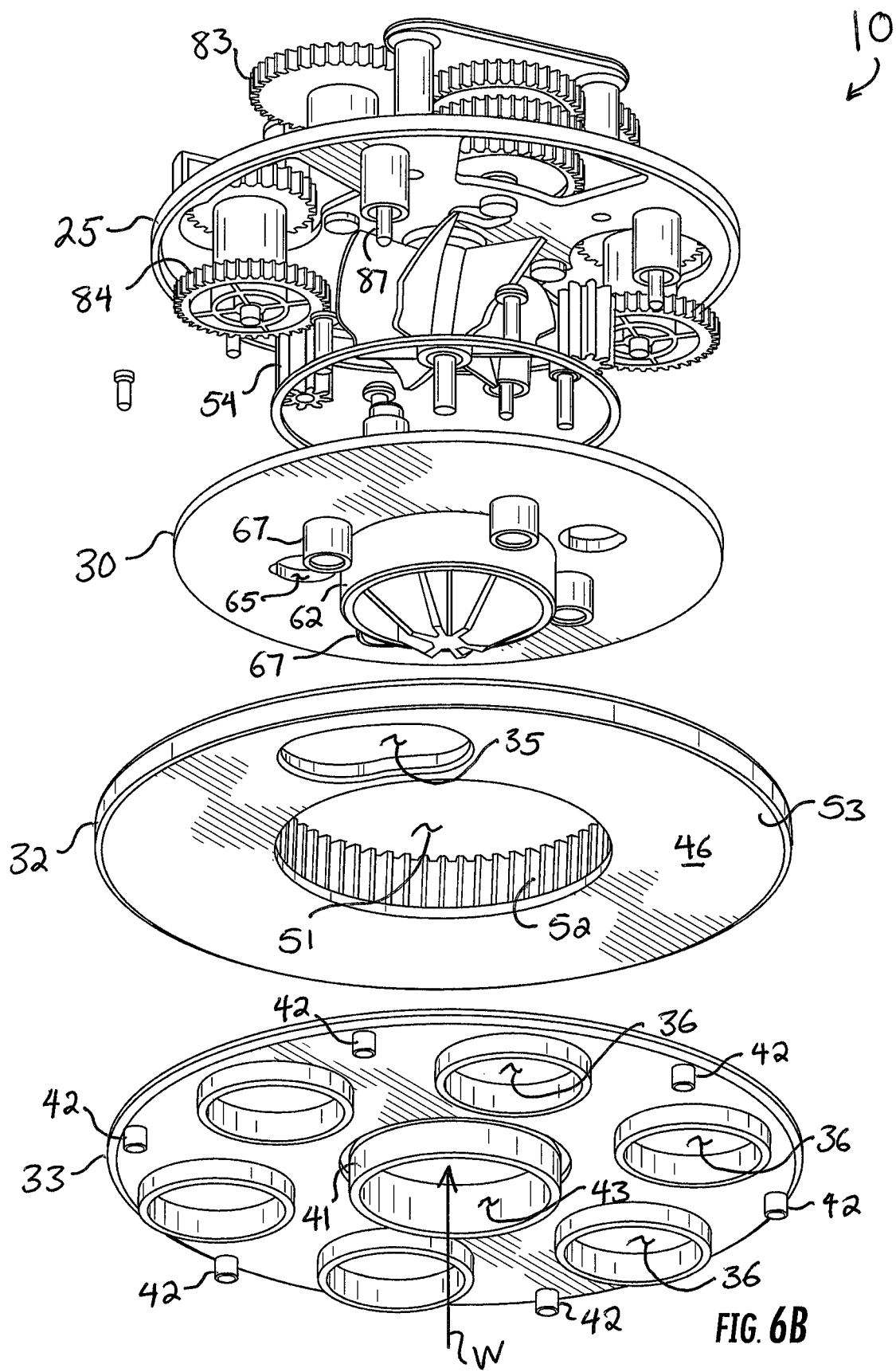

The drive gears 54 extend through and are carried in the lower table 30. The lower table 30 is a platform fixed and stationary with respect to the housing 13, mounted to the bearing plate 33 and disposed above the valve plate 32, so that the valve plate 32 is interposed between the bearing plate 33 and the lower table 30. Still referring to FIGS. 2 and 3, the lower table 30 includes a flat, annular flange element 60 extending radially from a central bore 61, defined by a lower collar 62 and a short upper collar 63. The lower collar 62 is snug fit within the upstanding collar 44 of the bearing plate 33, and the flange element 60 is disposed above the upstanding collar 50 of the valve plate 32, thereby preventing upward movement or lift of the valve plate 32 during operation. Two diametrically opposed holes 65 are formed flanking the bore 61, and semi-cylindrical chambers 66 are formed above and around these holes 65. The holes 65 and the chambers 66 are sized and shaped to carry the drive gears 54 for rotation with the chambers 66. The drive gears 54 extend just below the flange element 60, as seen in FIG. 3, so as to engage with the inner geared surface 52 of the valve plate 32 and drive the valve plate through rotation. The lower table 30 itself is fixed in position to the bearing plate 33 with downward sockets 67 which receive posts 68 extending upwardly from the bearing plate 33, as seen in FIGS. 6A and 6B. The collar 44 and the posts 68 of the bearing plate 33 thus extend through the central bore 51 of the valve plate 32 so that the lower table 30 mounts to the bearing plate 33. The lower table 30 includes a guide 70 disposed in the central bores 61 and 43 of the lower table 30 and the bearing plate 33. The guide 70 controls and directs the flow of water as it enters the valve 11 through the inlet 22. The guide 70 consists of a plurality of vanes 71, each of which directs the flow of water and provides regularity and a laminar quality to the incoming flow of water.

The axle 34 is seated in a blind socket formed in the guide 70 and extends upwardly therefrom. The impeller 31 is mounted to the axle 34 for free rotation thereabout, and is disposed above the guide 70 and below the upper table 25. The impeller 31 includes a plurality of canted blades 72 formed integrally to and extending radially outward from a hub mounted for free rotation on the axle 34, so that the impeller 31 is mounted for free rotation on the axle 34. There are preferably six blades 72, but one having ordinary skill in the art will readily appreciate that a fewer or greater number of blades 72 may be used so long as performance of the valve 11 is comparable. Referring still to FIG. 3, but also to FIG. 5, the impeller 31 is contained laterally within the lower collar 62 and the upper collar 63. The lower collar 62 has a reduced diameter with respect to the upper collar 63, and thus, the blades 72 of the impeller are reduced in radial length near their bottom, where they fit within the lower collar 62. The impeller 61 rotates in response to the application of the flow of water through the inlet 22 and past the guide 70. The impeller 31 terminates at its top in a gear that extends through the upper table 25. The impeller 31 is thereby coupled to the reduction gear assembly 26 in meshing engagement to drive the reduction gear assembly 26, and, in turn, imparts rotation to the valve plate 32 so as to sequentially move the port 35 into and out of alignment with each of the openings 36 in the bearing plate 33 through a plurality of positions.

Figure 4A:
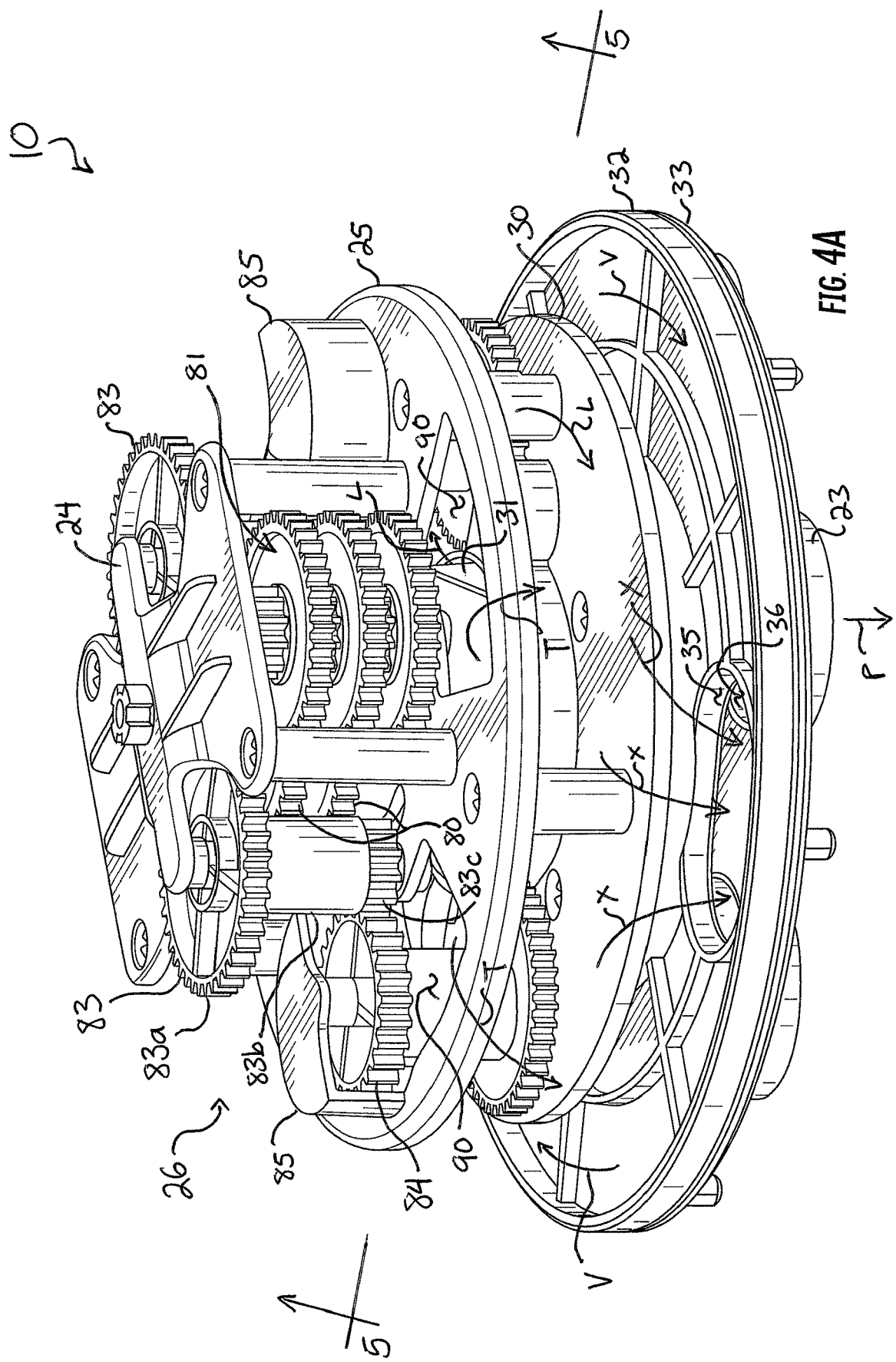
FIGS. 4A and 4B are top perspective views of the distribution assembly of FIG. 1A in isolation, showing steps of operation.
Figure 4B:
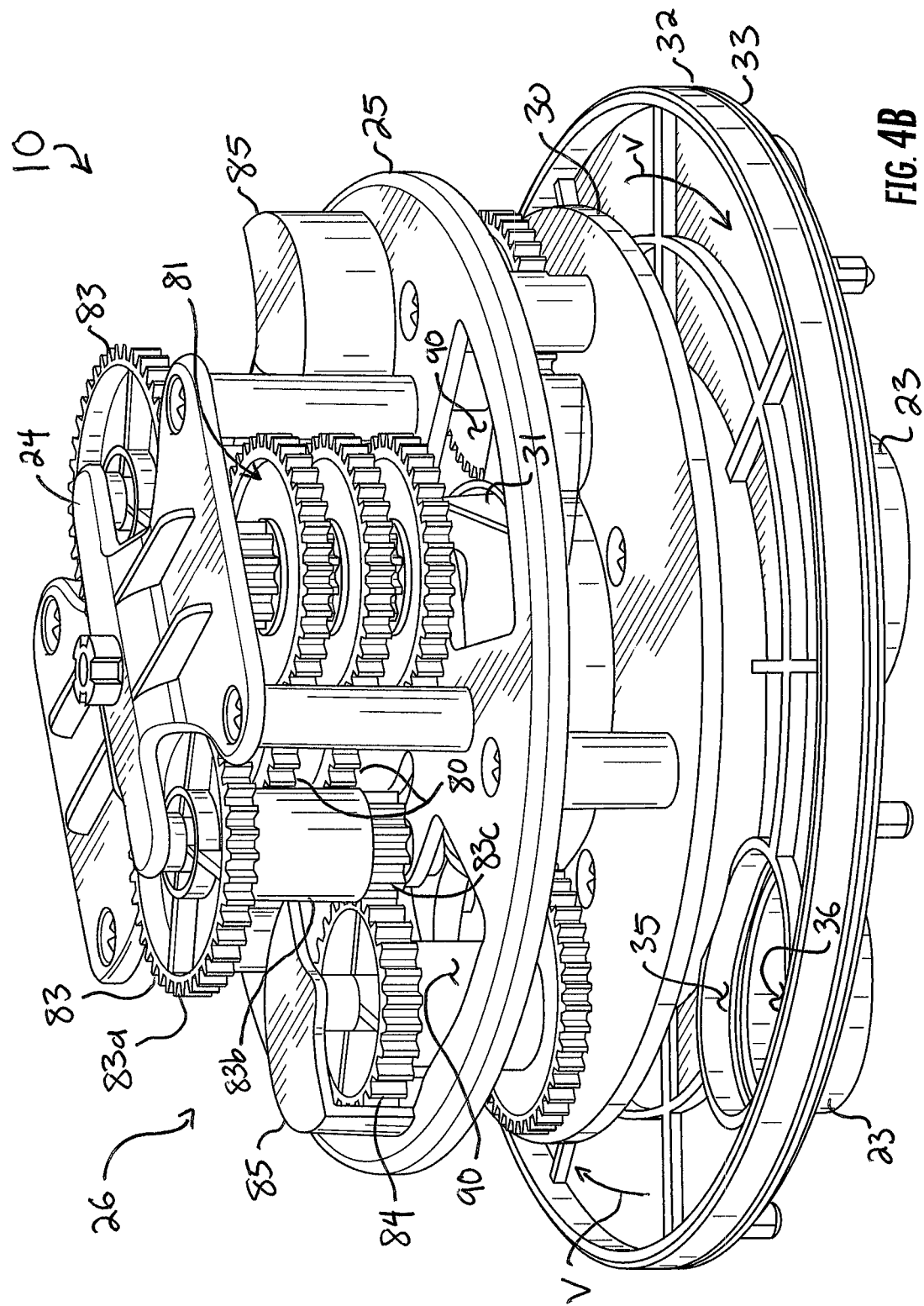

The reduction gear assembly 26 is shown most clearly in FIG. 2 and in FIGS. 4A and 4B, which shows the distribution assembly 10 in isolation. The reduction gear assembly 26 operates to convert the relatively fast rotation of the impeller into relatively slow rotation of the valve plate 32. The reduction gear assembly 26 is carried primarily on the upper table 25, which includes a horizontal top 85 and depending legs 86. The legs 86 support and hold the top 85 stationary with respect to the lower table 30; as seen in FIGS. 6A and 6B, the legs 86 are seated into sockets 87 projecting upwards from the lower table 30. Four large, wedged-shaped holes 90 are formed entirely through the upper table 25 to allow water in the interior 20 to circulate between the inlet 22 and the outlets 23.

The reduction gear assembly 26 includes a vertically-stacked set of central gears 80 meshingly engaged with two flanking, vertically-stacked sets of offset gears 81. The central and offset gears 80 and 81 include a large gear integrally formed to a small gear, such that the large gears of the central gears 80 engage with the small gears of the offset gears 81, and the small gears of the central gears 80 engage with the large gears of the offset gears 81. The central gears 80 are mounted for free rotation on the axle 34, and the offset gears 81 are mounted for free rotation on shafts 82 (shown in FIG. 5) which are fit into and contained from vertical movement by the cap 24 and the upper table 25. The impeller 31 and the reduction gear assembly 26 are thus elements of a drive assembly carried by the housing 13 and operably coupled to the valve plate 32 to impart rotation to the valve plate 32 in response to application of water through the valve 11 and consequential actuation of the drive assembly. The drive assembly includes the impeller 31, the reduction gear assembly 26, the upper and lower tables 25 and 30, and the primary, secondary, and drive gears 83, 84, and 54. The reduction gear assembly 26 is contained vertically between the cap 24 and the upper table 25.

Figure 5:
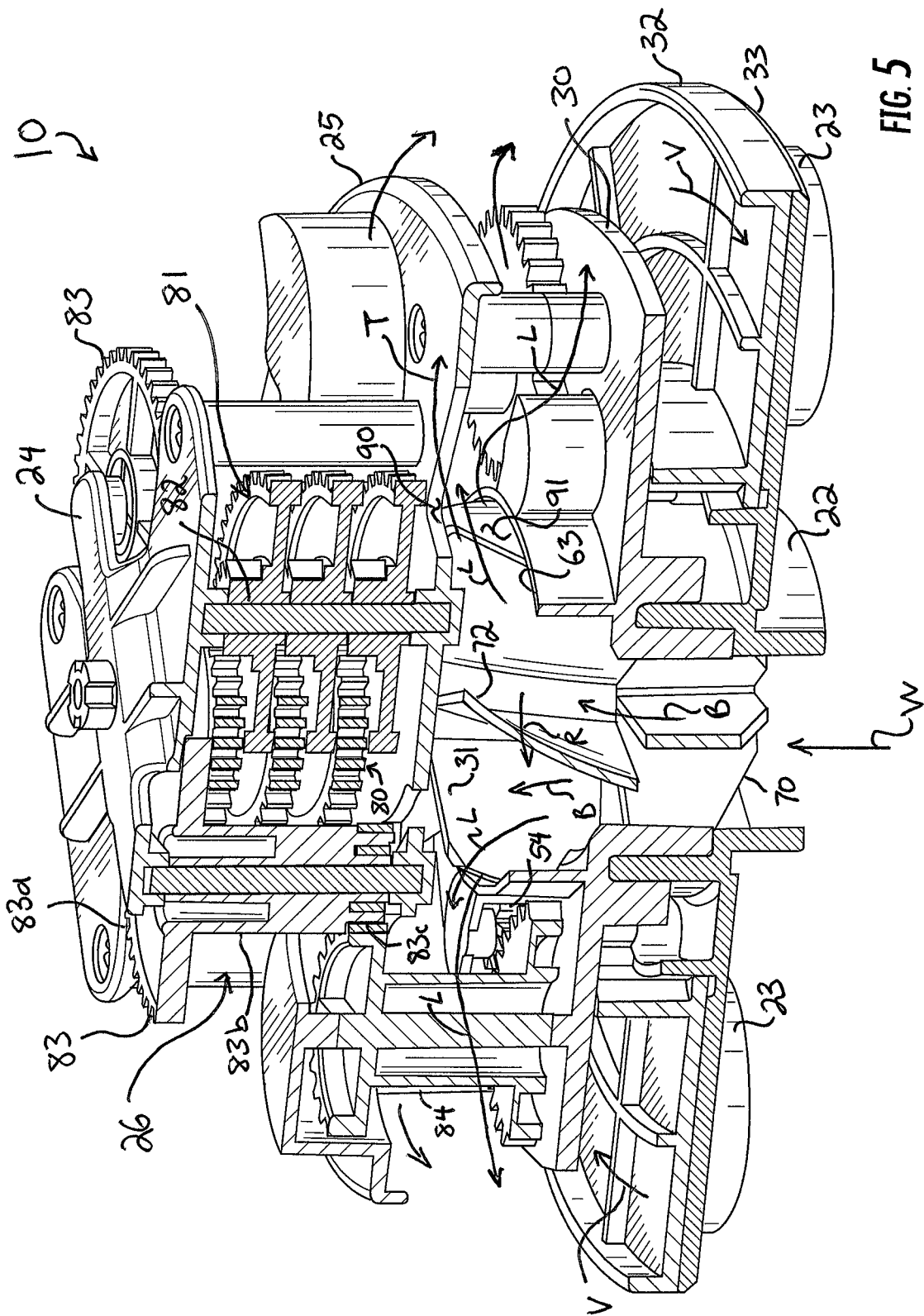
FIG. 5 is a top perspective, section view of the distribution assembly of FIG. 1A taken along the line 5-5 in FIG. 4A.

Rotation of the impeller 31 thus imparts rotation to each of the central and offset gears 80 and 81. As shown in FIGS. 2, 4A and 4B, and 5, two large primary gears 83 are mounted proximate to the set of central gears 80. Referring now to FIGS. 4 and 5, the primary gears 83 have large top primary gears 83a, a vertical shaft 83b, and a small bottom gear 83c, preferably formed monolithically and integrally as a single piece. The primary gears 83 are meshingly engaged to the top-most gear of the central gears 80, and imparts rotation from the central gears 80 to secondary gears 84 carried in semi-cylindrical holds 85, which in turn, are meshingly engaged with and impart rotation to the drive gears 54. Thus, in response to the application of a flow of water, rotation of the impeller 31 imparts rotation to all of the central and offset gears 80 and 81, which in turn imparts rotation to the primary gears 83, which impart rotation to the secondary gears 84, which finally impart rotation to the drive gears 54. The drive gears 54 extend down to the inner geared surface 52 and are disposed between the inner geared surface 52 and the collar 44 of the bearing plate 33. The drive gears 54, extending through the lower table 30, are meshingly engaged to the inner geared surface 52, thereby driving the valve plate 32 around in rotation so as to move the port 35 into and out of alignment with the openings 36 in the bearing plate 33.

As described above, relatively fast rotation of the impeller 31 imparts operation of the reduction gear assembly 26 and rotation of each of its constituent central and offset gears 80 and 81, the primary gears 83, the secondary gears 84, and the drive gears 54, which impart reduced and relatively slow rotation to the valve plate 32, which moves the port 35 sequentially into and out of alignment with each of the openings 36 in the bearing plate 33, so as to sequentially open and close each of the outlets 23. In this manner, the valve plate 32 controls the opening and closing of the outlets 23, thereby directing the flow of water through the valve 11 from the inlet 22 to each of the outlets 23.

In operation, the distribution assembly 10 is applied to a housing 13 to form the valve 11. The distribution assembly 10, and the reduction gear assembly 26, are removable from the housing 13 and may be replaced if either wears out. Neither wears against nor engages with the housing 13 in a manner in which the housing 13 itself is worn, so that the housing 13 need not ever be replaced because of wear from the distribution assembly 10. The distribution assembly 10 is applicable to the housing 13 to render the valve 11 operable.

With the distribution assembly 10 properly applied to the housing 13 and the lid 12 secured to the housing, such as with a conventional clamp ring, the valve 11 may be operated. The pump to which the valve 11 is connected in fluid communication is started, and a flow of water is supplied to the valve 11 along the line W indicated throughout several of the drawings. Referring now primarily to FIGS. 3, 4A and 4B, and 5, the flow of water enters the inlet 22 and encounters the guide 70, which smoothes and directs the flow of water upward into the impeller 31 along the lines B, causing the impeller 31 to spin. The impeller 31 rotates in a clockwise direction, as indicated with rotational arrows R in FIGS. 3 and 5, thereby imparting rotation to each gear of the reduction gear assembly 26.

Disposed immediately above the impeller 31 is the upper table 25, and thus water flowing upwardly along lines B encounters the upper table 25 and flows either upward or outward. Water flows upward by passing through the wedge-shaped holes 90 along lines T. Water moving along the lines T flows above the upper table 25 and circulates in the interior 20 above the upper table 25 before flowing back down toward the valve plate 32. Contrasted with water flowing upward, water flows outward from the impeller 31 by passing through the annular, vertical gap 91 formed between the upper table 25 and the lower table 30. The upper collar 63 of the lower table 30 is short, and does not extend fully to the upper table 25 above it, thereby forming a short, annular, vertical gap 91 between the upper table 25 and the upper collar 63 of the lower table 30. This gap 91 provides a conduit for the transmission of water laterally out of the impeller along the lines L in the drawings. Water moving along lines L flows generally laterally between the upper and lower tables 25 and 30 before circulating into the rest of the interior 20 and then back down toward the valve plate 32.

Water thus circulates throughout the interior 20 of the valve 11 and eventually moves downward toward the valve plate 32. Rotation of the drive gears 54 causes the valve plate 32 to rotate. Water flows through the port 35 in the valve plate 32 along the lines X, and water flows out of the valve 11 through the outlets 23 along the line P. In FIG. 4A, the valve plate 32 is illustrated rotating toward the next opening 36 in a clockwise direction, as indicated by the arcuate lines V, and away from the opening 36 disposed above the "current" outlet 23. Therefore, outflow of water through the opening 36 and the current outlet 23 is ending, and the "next" outlet 23 will be fully opened promptly. Before the next outlet 23 is fully opened, however, there is a period in which both the current outlet 23 and the next outlet 23 will be partially open. Because, as described earlier, the circumferential dimension of the port 35 is larger than the diameter of the openings 36, the port 35 uniquely extends over two adjacent openings 36 for a short time, thus coupling each of the corresponding adjacent outlets 22 in fluid communication with the inlet 22 for a short time. This provides an advantage over prior art valves, which experienced back pressure, excessive wear, and breakage issues because of the large pressure that would build inside a valve housing when water continued to be supplied to the valve from the pump but had no exit while transitioning from one outlet to another.

As the valve plate 32 continues to move along the line V, the opening 36 closes, and flow to the current outlet 23 terminates. The valve plate 32 is thus moving from one position to a subsequent position. The pop-up cleaning heads in the pool which are coupled to the current outlet 23 thus recede into the sidewall of the pool and cease operating. The valve plate 32 then moves fully over the next opening 36, aligning with the opening 36, thereby fully opening the next outlet 22 and causing the pop-up cleaning heads which are coupled to the next outlet 22 to rise and begin cleaning the pool surface. The valve plate 32 continues to rotate around, sequentially and continuously moving the port 35 into and out of alignment with each of the openings 36, and sequentially and continuously opening and closing each of the corresponding outlets 22.

A preferred embodiment is fully and clearly described above so as to enable one having skill in the art to understand, make, and use the same. Those skilled in the art will recognize that modifications may be made to the described embodiment without departing from the spirit of the invention. To the extent that such modifications do not depart from the spirit of the invention, they are intended to be included within the scope thereof.

The invention claimed is:

1. An assembly for directing a flow of water through a water distribution valve including a housing having a bottom, an inlet at the bottom, and a plurality of outlets at the bottom, the assembly comprising:
   a bearing plate including a plurality of openings and a central, upstanding collar projecting above the bearing plate between the openings, wherein the collar is open at both of its ends;
   a valve plate coaxial to and encircling the upstanding collar and including a port, the valve plate mounted for rotation on and with respect to the bearing plate; and
   a drive assembly operably coupled to impart rotational movement of the valve plate with respect to the bearing plate, in response to the application of a flow of water, through a plurality of positions each characterized by the port of the valve plate being aligned with a respective one of the plurality of openings.

2. The assembly of claim 1, wherein the drive assembly is operably coupled to the valve plate to impart rotational movement to the valve plate.

3. The assembly of claim 1, wherein the valve plate is in direct and continuous contact with the bearing plate.

4. The assembly of claim 1, wherein the port is larger than each of the plurality of openings.

5. The assembly of claim 1, wherein the valve plate and the bearing plate each include a coaxial central bore formed entirely therethrough.

6. The assembly of claim 1, wherein the valve plate includes an upstanding wall formed with a gear surface.

7. The assembly of claim 1, wherein the drive assembly includes an impeller.

8. The assembly of claim 1, wherein the drive assembly includes a table and a reduction gear assembly mounted on the table.

9. The assembly of claim 8, wherein the table has a top, legs spacing the table vertically apart from the valve plate, and holes formed through the top so as to allow water to flow through the table.

10. A water distribution assembly for directing a flow of water through a water distribution valve, the assembly comprising:
   a bearing plate including a plurality of openings and a central, upstanding collar projecting above the bearing plate between the openings, wherein the collar is open at both of its ends;
   a valve plate coaxial to and encircling the upstanding collar, and including a port, the valve plate mounted for rotation about an axis on and with respect to the bearing plate;
   a table, and a reduction gear assembly carried on the table; and
   the reduction gear assembly imparts rotation to the valve plate in response to application of a flow of water through the reduction gear assembly.

11. The assembly of claim 10, further comprising an impeller operably coupled to the reduction gear assembly.

12. The assembly of claim 10, wherein the valve plate rotates through a plurality of positions each characterized by the port of the valve plate being aligned with a respective one of the plurality of openings.

13. The assembly of claim 10, wherein the openings of the bearing plate and the port of the valve plate are oriented parallel to the axis.

14. The assembly of claim 10, wherein the port is larger than each of the plurality of openings.

15. The assembly of claim 10, wherein the valve plate and the bearing plate each include a coaxial central bore formed entirely therethrough.

16. The assembly of claim 10, further comprising:
   an upstanding wall on the valve plate formed with an internal gear surface; and
   a drive gear depending from the reduction gear assembly is engaged with the internal gear surface.

17. The assembly of claim 10, wherein the valve plate is in direct and continuous contact with the bearing plate.

18. A water distribution valve for directing a flow of water through a swimming pool cleaning system, the water distribution valve comprising:
   a housing having a bottom, an inlet at the bottom, and a plurality of outlets at the bottom;
   a valve plate including a port, the valve plate mounted for rotation in the housing among a plurality of positions, each position of the valve plate characterized by the port being aligned with a respective one of the plurality of outlets of the housing;
   an upstanding collar, around which the valve plate is coaxially mounted, projecting between the outlets and though the valve plate, wherein the collar is open at both of its ends;
   a drive assembly carried by the housing and operably coupled to impart rotation to the valve plate; and
   in response to application of the flow of water into the housing, the drive assembly imparts rotation to the valve plate through the plurality of positions.

19. The water distribution valve assembly of claim 18, further comprising:
   a bearing plate formed with a plurality of openings, each of the plurality openings aligned with a respective one of the plurality of outlets;
   wherein the valve plate is mounted for rotation in contact with the bearing plate.

20. The water distribution valve assembly of claim 19, wherein the bearing plate is interposed in direct contact between the bottom of the housing and the valve plate.

21. An assembly for directing a flow of water through a water distribution valve including a housing having a bottom, an inlet, and a plurality of outlets at the bottom, the assembly comprising:
   a bearing plate including a plurality of openings and a central, upstanding collar projecting above the bearing plate between the openings, wherein the collar is open at both of its ends;
   a valve plate coaxial to and encircling the upstanding collar and including a port, the valve plate mounted in the housing for rotation with respect to the bearing plate; and
   a drive assembly coupled to impart rotational movement of the valve plate with respect to the bearing plate, in response to the application of a flow of water into the inlet, through a plurality of positions each characterized by the port of the valve plate being aligned with a respective one of the plurality of openings.

22. A water distribution assembly for directing a flow of water through a water distribution valve, the assembly comprising:
   a housing having a bottom;
   a bearing plate including a plurality of openings above the bottom of the housing and a central, upstanding collar projecting above the bearing plate between the openings, wherein the collar is open at both of its ends;
   a valve plate coaxial to and encircling the upstanding collar, the valve plate including a port and being mounted for rotation about an axis with respect to the bearing plate;
   a reduction gear assembly and an impeller coupled to the reduction gear assembly, wherein the reduction gear assembly imparts rotation to the valve plate in response to application of a flow of water against the impeller.

23. The water distribution valve assembly of claim 22, wherein the valve plate moves through a plurality of positions each characterized by the port of the valve plate being aligned with a respective one of the plurality of openings, in response to the application of a flow of water into the inlet.

24. A water distribution valve for directing a flow of water through a swimming pool cleaning system, the water distribution valve comprising:
   a housing having a bottom and a plurality of outlets at the bottom;
   a bearing plate above the bottom, the bearing plate including a plurality of openings and a central, upstanding collar projecting above the bearing plate between the openings, wherein the collar is open at both of its ends;
   a valve plate coaxial to and encircling the upstanding collar, the valve plate including a port and being mounted for rotation for rotation in the housing among a plurality of positions, each position of the valve plate characterized by the port being aligned with a respective one of the plurality of outlets of the housing;
   a drive assembly carried by the housing and coupled to impart rotation to the valve plate; and in response to application of the flow of water into the housing, the drive assembly imparts rotation to the valve plate through the plurality of positions.

25. The water distribution valve of claim 24, wherein the bearing plate is disposed between the bottom of the housing and the valve plate.

* * * * *